United States Patent
Asuka et al.

(10) Patent No.: US 11,560,166 B2
(45) Date of Patent: Jan. 24, 2023

(54) TRAIN CONTROL APPARATUS AND TRAIN CONTROL METHOD

(71) Applicant: Mitsubishi Electric Corporation, Tokyo (JP)

(72) Inventors: Masashi Asuka, Tokyo (JP); Takaya Katsuragi, Tokyo (JP); Shuichi Takagi, Tokyo (JP); Katsunori Tsuchida, Tokyo (JP); Tomohiro Onishi, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 373 days.

(21) Appl. No.: 16/963,419

(22) PCT Filed: Jan. 26, 2018

(86) PCT No.: PCT/JP2018/002550
§ 371 (c)(1),
(2) Date: Jul. 20, 2020

(87) PCT Pub. No.: WO2019/146083
PCT Pub. Date: Aug. 1, 2019

(65) Prior Publication Data
US 2021/0403061 A1    Dec. 30, 2021

(51) Int. Cl.
*B61L 27/20*    (2022.01)
*B61L 23/16*    (2006.01)
(Continued)

(52) U.S. Cl.
CPC ............... *B61L 23/16* (2013.01); *B60L 15/40* (2013.01); *B61L 23/20* (2013.01)

(58) Field of Classification Search
CPC ...... B61L 23/16; B61L 23/20; B61L 15/0027; B61L 27/20; B61L 23/14; B61L 25/02;
(Continued)

(56) References Cited

U.S. PATENT DOCUMENTS 5,474,267 A    12/1995   Kubota et al.
2010/0063734 A1*  3/2010  Kumar .................. B61L 25/026
                                                 701/300
(Continued)

FOREIGN PATENT DOCUMENTS

CN    107336726       * 11/2017
JP    H06278608 A      10/1994
(Continued)

OTHER PUBLICATIONS

Office Action dated Feb. 23, 2022, issued in corresponding Indian Patent Application No. 202027029772, 5 pages.
(Continued)

*Primary Examiner* — Mark T Le
(74) *Attorney, Agent, or Firm* — Buchanan Ingersoll & Rooney PC

(57) ABSTRACT

A train control apparatus includes a setting reception unit that receives setting information regarding a temporary speed limit section and a speed limit. A control unit generates temporary speed limit information for the trains. A communication unit transmits the temporary speed limit information to the trains. If information regarding all temporary speed limit sections cannot be included in the temporary speed limit information, the control unit includes, in the temporary speed limit information, information regarding a specified number of temporary speed limit sections located on a traveling direction side, and changes a speed limit in one or more temporary speed limit sections included in the temporary speed limit information on the basis of a speed limit set in a temporary speed limit section that is adjacent to a temporary speed limit section included in the temporary speed limit information, and is not included in the temporary speed limit information.

7 Claims, 12 Drawing Sheets

(51) Int. Cl.
*B60L 15/40* (2006.01)
*B61L 23/20* (2006.01)

(58) Field of Classification Search
CPC ...... B61L 3/008; B61L 27/70; B61L 15/0018;
B61L 2205/00; B61L 27/16; B60L 15/40
See application file for complete search history.

(56) References Cited

U.S. PATENT DOCUMENTS

| | | | |
|---|---|---|---|
| 2011/0238242 A1* | 9/2011 | Nichter | ................ B61L 27/70 |
| | | | 701/19 |
| 2017/0113708 A1* | 4/2017 | Ferrari | ................ B61L 27/04 |

FOREIGN PATENT DOCUMENTS

| | | | |
|---|---|---|---|
| JP | 2003291797 A | 10/2003 | |
| JP | 2012152085 A | 8/2012 | |
| JP | 2014159242 A | 9/2014 | |
| WO | 2013172840 A1 | 11/2013 | |

OTHER PUBLICATIONS

International Search Report (PCT/ISA/210) dated Apr. 3, 2018, by the Japan Patent Office as the International Searching Authority for International Application No. PCT/JP2018/00255.
Written Opinion (PCT/ISA/237) dated Apr. 3, 2018, by the Japan Patent Office as the International Searching Authority for International Application No. PCT/JP2018/00255.

* cited by examiner

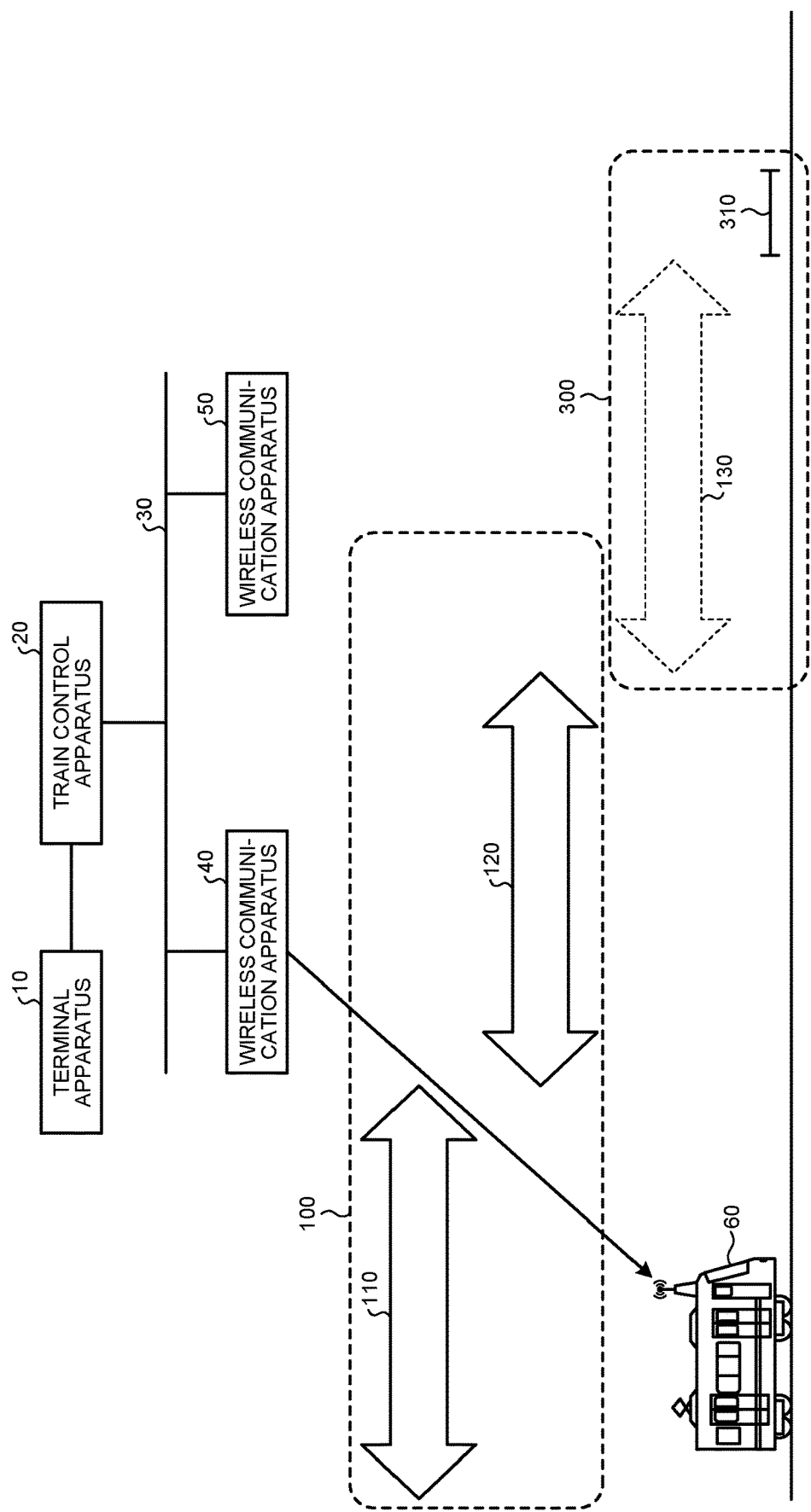

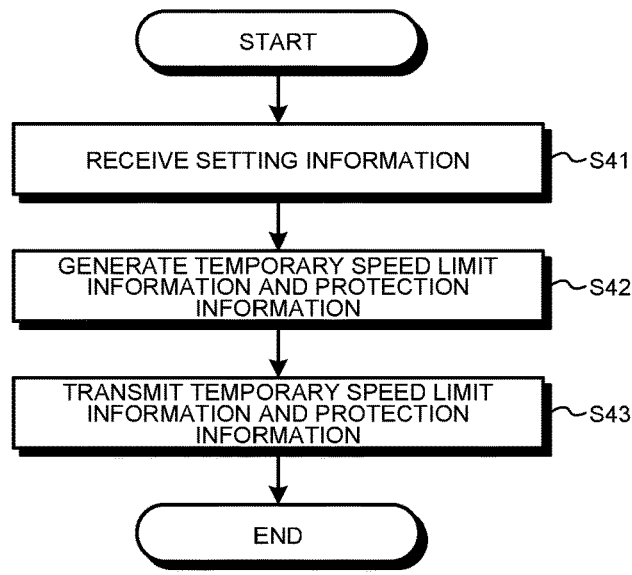
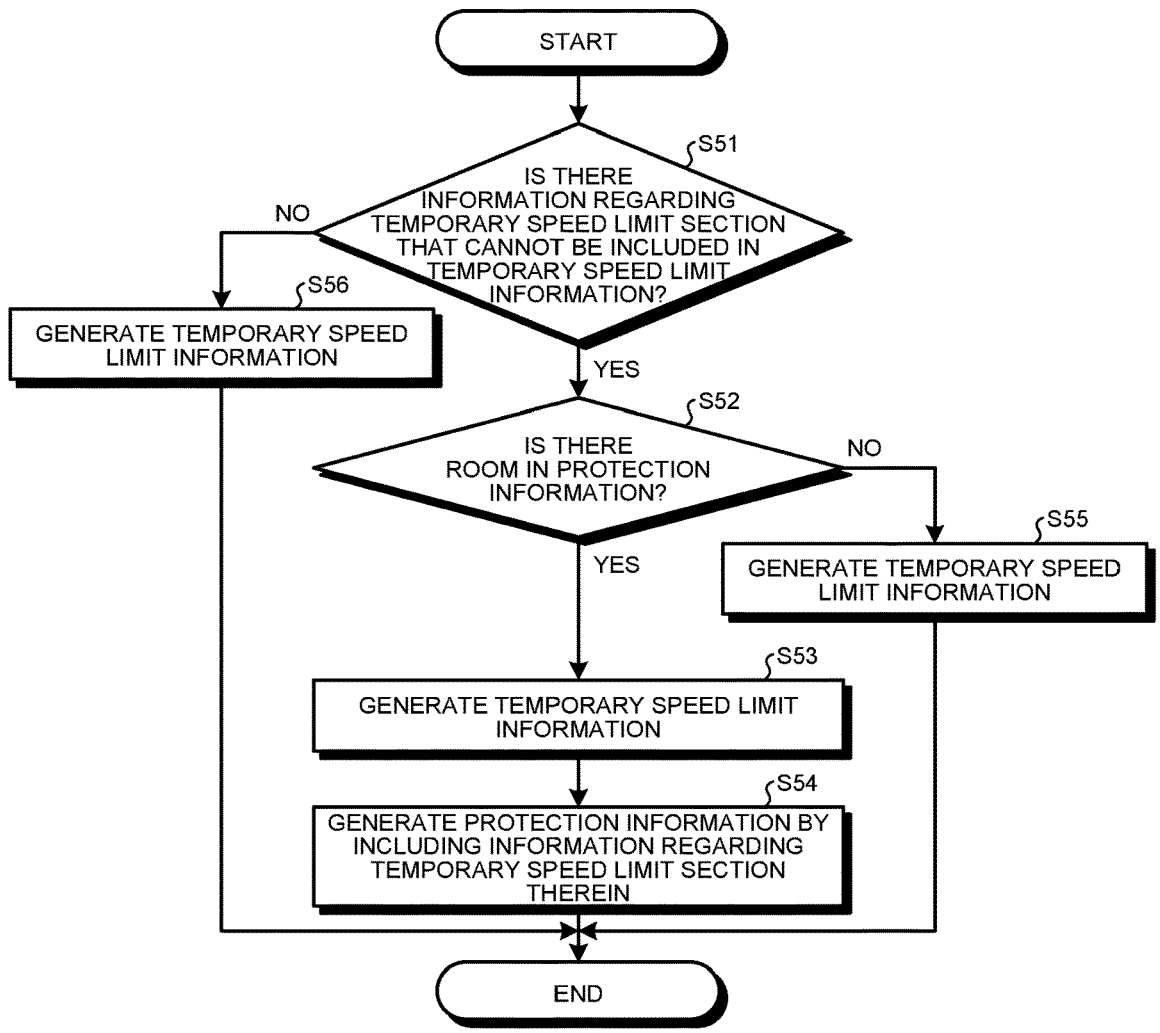

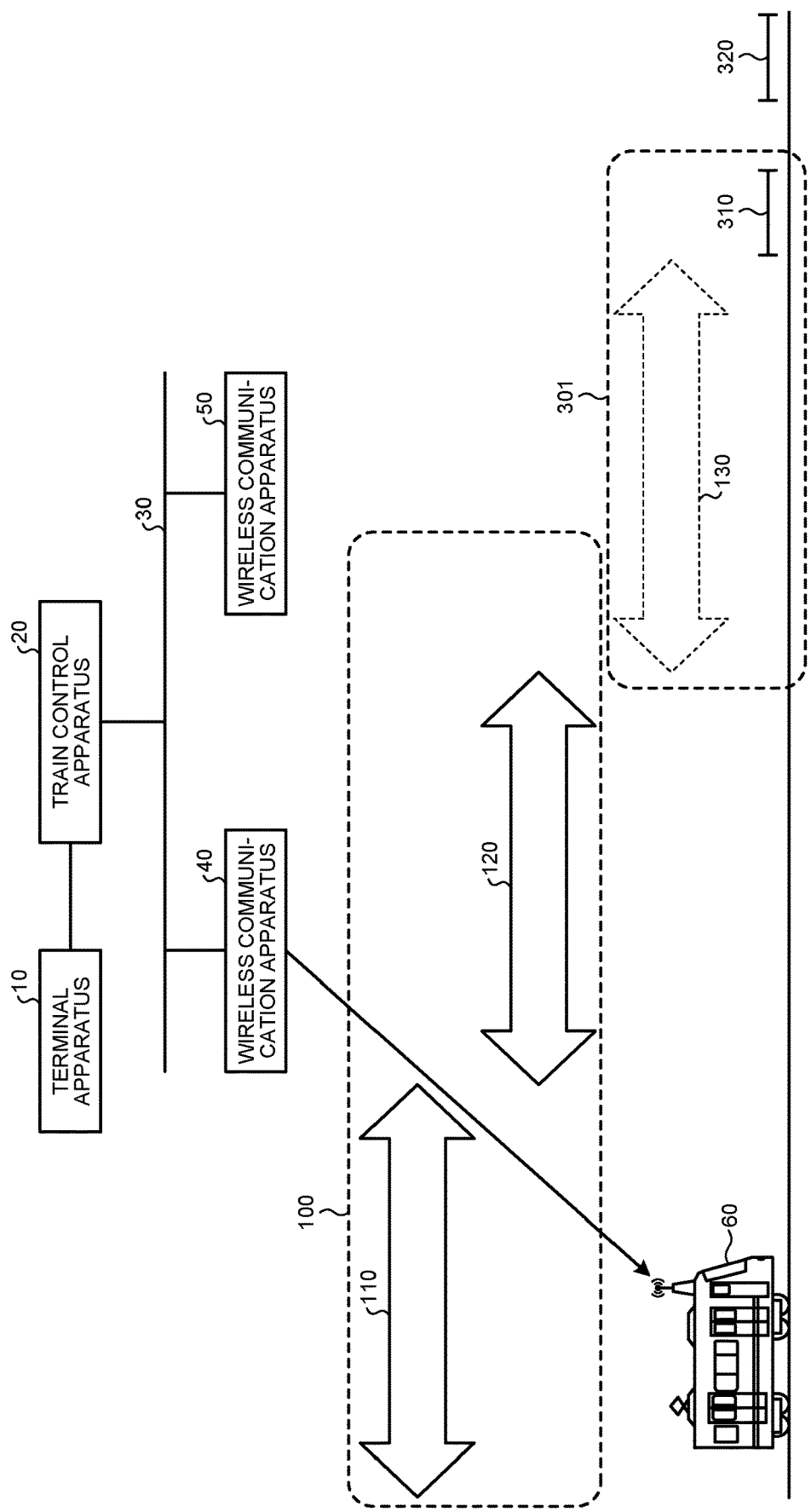

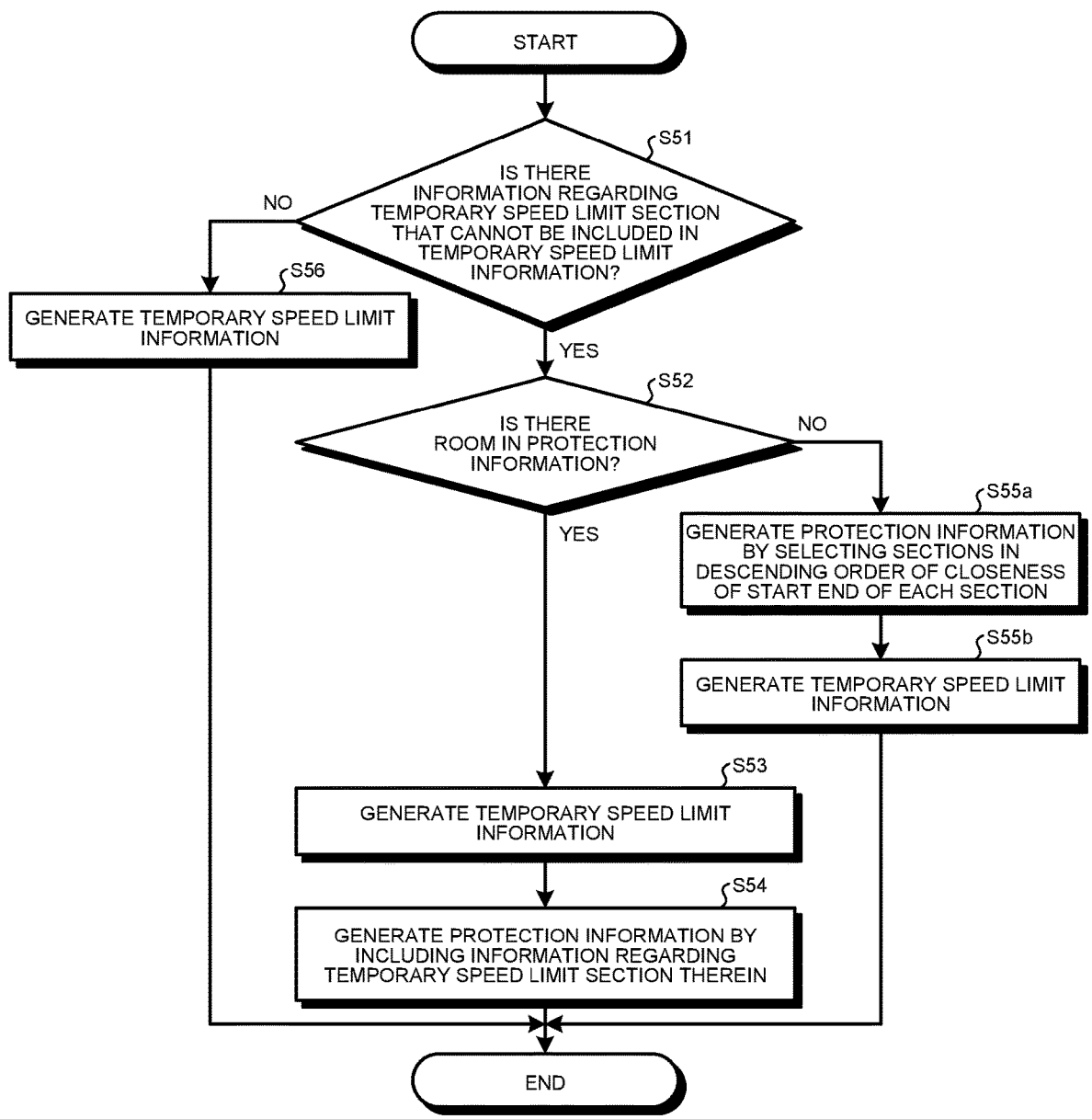

TRAIN CONTROL APPARATUS AND TRAIN CONTROL METHOD

FIELD

The present invention relates to a train control apparatus and a train control method for controlling operation of a train.

BACKGROUND

Conventionally, a ground apparatus may set a temporary speed limit for temporarily limiting a speed of a train in a construction section, a bad weather section, or the like. The section where the temporary speed limit is set is defined as a temporary speed limit section. When the train acquires temporary speed limit information which is control information indicating the content of the setting of the temporary speed limit from the ground apparatus, the train decelerates to the set speed limit and travels in the set temporary speed limit section. Such a technique is disclosed in Patent Literature 1.

CITATION LIST

Patent Literature

Patent Literature 1: Japanese Patent Application Laid-open No. 2014-159242

SUMMARY

Technical Problem

The setting of the temporary speed limit section where the temporary speed limit is set is performed over a plurality of sections, and a different speed limit may be set for each temporary speed limit section. However, in a ground apparatus described in Patent Literature 1, there is a limit on the number of temporary speed limit sections which can be transmitted to a train by single transmission of temporary speed limit information. Thus, speed limits in all temporary speed limit sections for which speed limits are to be set may not be completely transmitted by single transmission of the temporary speed limit information. In such a case, the ground apparatus transmits, when the train passes through one temporary speed limit section, temporary speed limit information including a speed limit in a temporary speed limit section which has not been transmitted. Therefore, when the speed limit in the temporary speed limit section which has not been received is so low that the train cannot decelerate before reaching the temporary speed limit section which has not been received, the train exceeds the speed limit, which is a problem.

The present invention has been made in view of the above, and an object thereof is to provide a train control apparatus capable of operating a train so as not to exceed a speed limit in each temporary speed limit section in a case where a plurality of temporary speed limit sections is set.

Solution to Problem

In order to solve the above-described problem and achieve the object, the present invention is a train control apparatus which controls operation of a train. The train control apparatus includes: a setting reception unit that receives setting information regarding a temporary speed limit section where a speed of the train is temporarily limited and a speed limit in the temporary speed limit section; a control unit that generates temporary speed limit information for each train with respect to trains that travel within a control range on the basis of the setting information; and a communication unit that transmits the temporary speed limit information to each train. In a case where it is not possible to include information regarding all temporary speed limit sections in the temporary speed limit information, the control unit includes, in the temporary speed limit information, information regarding a specified number of temporary speed limit sections located on a traveling direction side from a position of the train, and changes a speed limit in one or more temporary speed limit sections included in the temporary speed limit information on the basis of a speed limit set in a temporary speed limit section that is adjacent to a temporary speed limit section included in the temporary speed limit information, and is not included in the temporary speed limit information.

Advantageous Effects of Invention

According to the present invention, the train control apparatus achieves an effect that it is possible to operate a train so as not to exceed a speed limit in each temporary speed limit section in a case where a plurality of temporary speed limit sections is set.

BRIEF DESCRIPTION OF DRAWINGS

FIG. 11 is a diagram illustrating a first example of a case where the train control apparatus according to a third embodiment transmits protection information with information regarding a temporary speed limit section included therein.

FIG. 12 is a flowchart illustrating an operation in which the train control apparatus according to the third embodiment transmits temporary speed limit information and protection information to the train.

FIG. 13 is a flowchart illustrating a first example of an operation of the control unit in the train control apparatus according to the third embodiment.

FIG. 14 is a diagram illustrating a second example of the case where the train control apparatus according to the third embodiment transmits protection information with information regarding the temporary speed limit section included therein.

FIG. 15 is a flowchart illustrating a second example of the operation of the control unit in the train control apparatus according to the third embodiment.

DESCRIPTION OF EMBODIMENTS

Hereinafter, a train control apparatus and a train control method according to each embodiment of the present invention will be described in detail with reference to the drawings. The present invention is not limited to the embodiments.

First Embodiment

Figure 1:
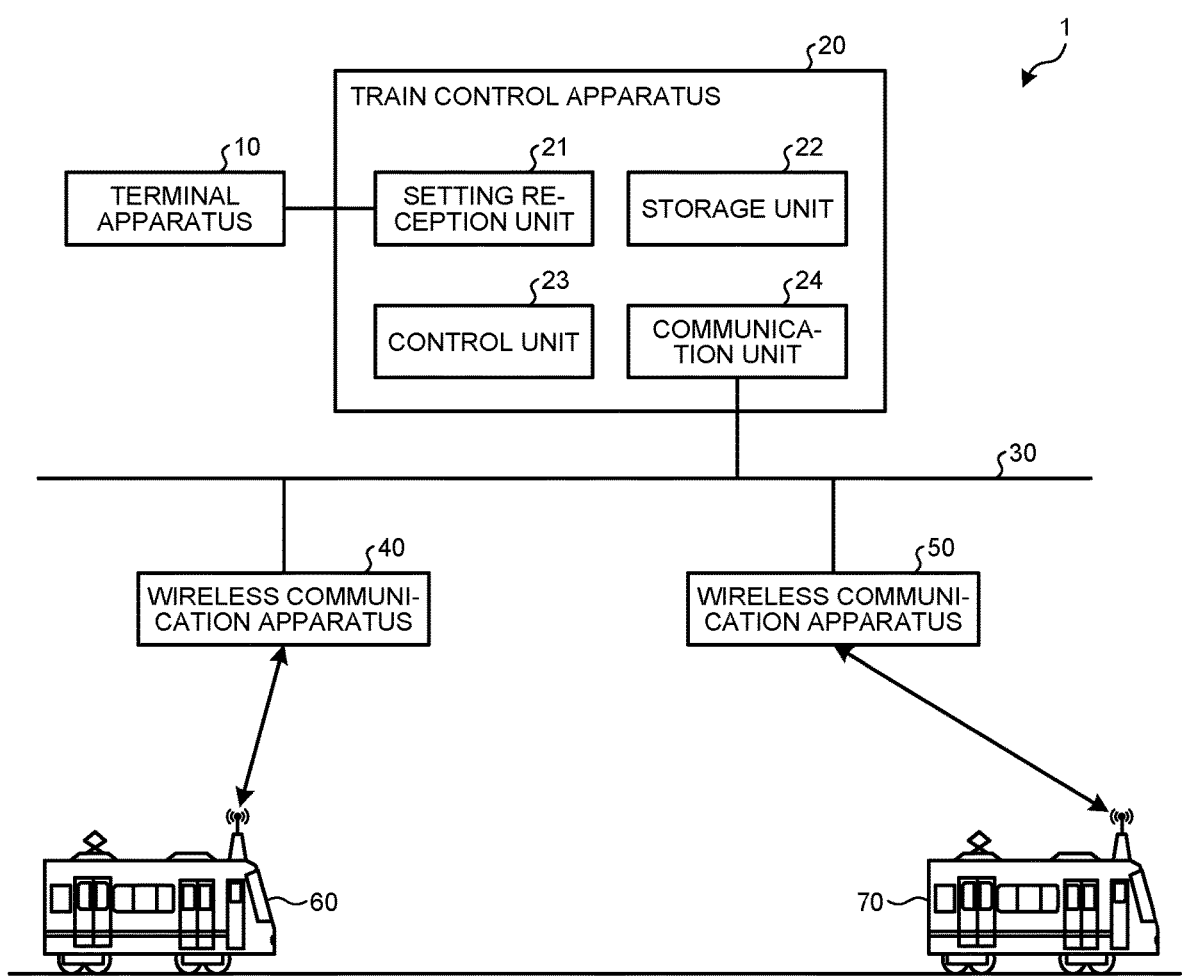
FIG. 1 is a diagram illustrating an example configuration of a wireless train control system according to a first embodiment.

FIG. 1 is a diagram illustrating an example configuration of a wireless train control system 1 according to a first embodiment of the present invention. The wireless train control system 1 includes a terminal apparatus 10, a train control apparatus 20, a communication network 30, wireless communication apparatuses 40 and 50, and trains 60 and 70.

The train control apparatus 20 is a base apparatus which controls operation of the trains 60 and 70 travelling within a control range. The train control apparatus 20 generates control information such as route information, temporary speed limit information, and protection information, and transmits the control information to the trains 60 and 70 via the communication network 30, and the wireless communication apparatus 40 or the wireless communication apparatus 50. The route information includes, for example, information regarding a stop limit for the train 60 based on a position of the train 70 which is a preceding train. The temporary speed limit information includes information regarding temporary speed limit sections where speeds of the trains 60 and 70 are temporarily limited, speed limits in the temporary speed limit sections, and the like. The protection information includes information regarding protection sections where the entry of the trains 60 and 70 is prohibited. Although the number of trains is two in FIG. 1, this is merely an example, and the train control apparatus 20 can control operation of one or three or more trains.

The terminal apparatus 10 receives setting information for the train control apparatus 20 from a setter using a keyboard, a mouse, a touch panel, or the like, and outputs the received setting information to the train control apparatus 20. The setting information includes the above-described temporary speed limit sections, speed limits, and protection sections. The setter is, for example, a person in charge of managing operation in a railway company. With the use of the terminal apparatus 10, the setter can set a plurality of temporary speed limit sections, a speed limit for each temporary speed limit section, and a plurality of protection sections. Regarding the setting of the temporary speed limit sections and the protection sections, there is a method in which the setter sets a start point and an end point on the basis of, for example, kilometrage from a point of origin of a target train line, but there is no limitation thereto.

The communication network 30 is a communication network which connects the train control apparatus 20 and the wireless communication apparatuses 40 and 50. The communication network 30 may be a wired communication network or a wireless communication network.

The wireless communication apparatuses 40 and 50 transmit the control information obtained from the train control apparatus 20 via the communication network 30 to the trains 60 and 70 within a communication area. In addition, the wireless communication apparatuses 40 and 50 transmit position information regarding the trains 60 and 70 received from the trains 60 and 70 to the train control apparatus 20 via the communication network 30. Although the number of wireless communication apparatuses is two in FIG. 1, this is merely an example, and it is possible to increase the number thereof to three or more.

The trains 60 and 70 periodically detect their own positions and transmit position information indicating their own positions to the train control apparatus 20 via the wireless communication apparatuses 40 and 50 and the communication network 30. The traveling direction of the trains 60 and 70 is from left to right in the example of FIG. 1. The trains 60 and 70 travel on the basis of the control information acquired from the train control apparatus 20 via the wireless communication apparatuses 40 and 50 and the communication network 30.

Next, a configuration of the train control apparatus 20 will be described. The train control apparatus 20 includes a setting reception unit 21, a storage unit 22, a control unit 23, and a communication unit 24. The setting reception unit 21 receives setting information regarding temporary speed limit sections, speed limits, protection sections, and the like from the setter via the terminal apparatus 10. The storage unit 22 stores the route information regarding a train line on which the trains 60 and 70 travel. With the use of the position information periodically acquired from the trains 60 and 70 traveling within the control range, and the route information stored in the storage unit 22, the control unit 23 determines stop limits for the trains 60 and 70 traveling within the control range, and controls operation of the trains 60 and 70. In addition, for the trains 60 and 70 travelling within the control range, the control unit 23 generates control information such as temporary speed limit information, protection information, and the like, for each of the trains 60 and 70 on the basis of the setting information acquired from the setting reception unit 21. The control unit 23 outputs the generated control information to the communication unit 24. The communication unit 24 transmits the control information such as temporary speed limit information and protection information acquired from the control unit 23 to the wireless communication apparatuses 40 and 50 via the communication network 30.

Next, an operation will be described in which the train control apparatus 20 transmits temporary speed limit information to the train 60 to control the operation of the trains 60 and 70. The train control apparatus 20 generates temporary speed limit information on the basis of the information regarding the temporary speed limit sections and the speed limit in each temporary speed limit section received from the terminal apparatus 10, and transmits the generated temporary speed limit information to the trains 60 and 70. However, even if the train control apparatus 20 receives information regarding a plurality of temporary speed limit sections and the speed limit in each temporary speed limit section from the terminal apparatus 10, the number of temporary speed limit sections which can be transmitted as temporary speed limit information to the trains 60 and 70 by single transmission is generally limited.

Figure 2:
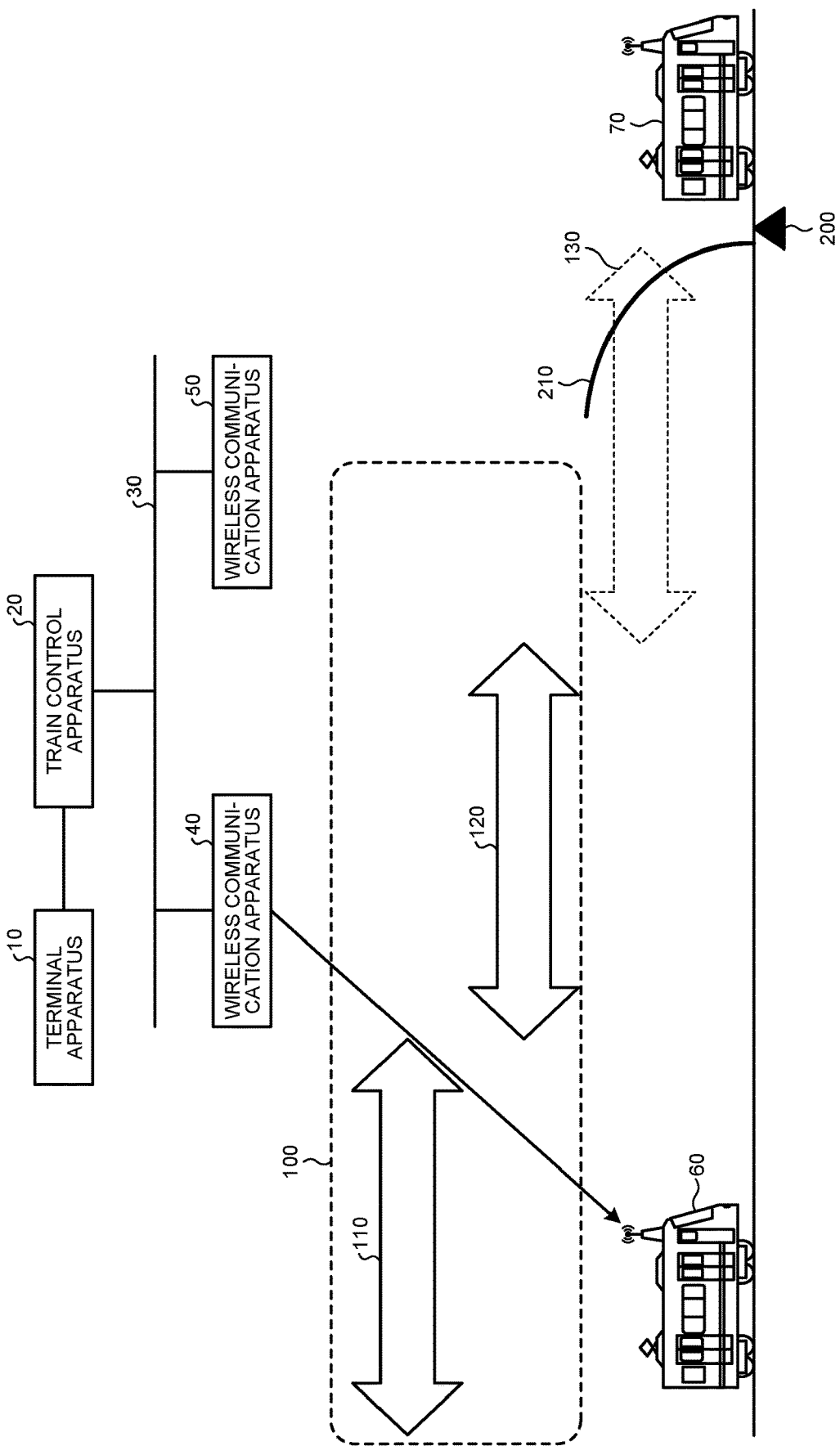
FIG. 2 is a diagram illustrating a first example of temporary speed limit information transmitted by a train control apparatus according to the first embodiment.

FIG. 2 is a diagram illustrating a first example of the temporary speed limit information transmitted by the train control apparatus 20 according to the first embodiment. In FIG. 2, positions of the temporary speed limit sections 110 to 130 in a horizontal direction indicate ranges of respective temporary speed limit sections, and positions of the temporary speed limit sections 110 to 130 in a vertical direction indicate speed limits in respective temporary speed limit sections. That is, the example of FIG. 2 illustrates that a speed limit in the temporary speed limit section 110, that in the temporary speed limit section 120, and that in the temporary speed limit section 130 are in decreasing order. In FIG. 2, a stop limit 200 is set by the train control apparatus 20 for the train 60 on the basis of a position of the train 70 which is a preceding train. As an example, a case will be described in which the train control apparatus 20 transmits temporary speed limit information 100 to the train 60. Here, it is assumed that the train control apparatus 20 can transmit pieces of information regarding two temporary speed limit sections 110 and 120 as the temporary speed limit information 100. Although the train control apparatus 20 has received setting for the temporary speed limit section 130 as well from the setter via the terminal apparatus 10, the train control apparatus 20 cannot transmit the information regarding the temporary speed limit section 130 simultaneously with the information regarding the temporary speed limit sections 110 and 120 to the train 60. The train 60 generates a speed pattern 210 on the basis of the information regarding the stop limit 200 and the information regarding the temporary speed limit sections 110 and 120 received from the train control apparatus 20.

Figure 3:
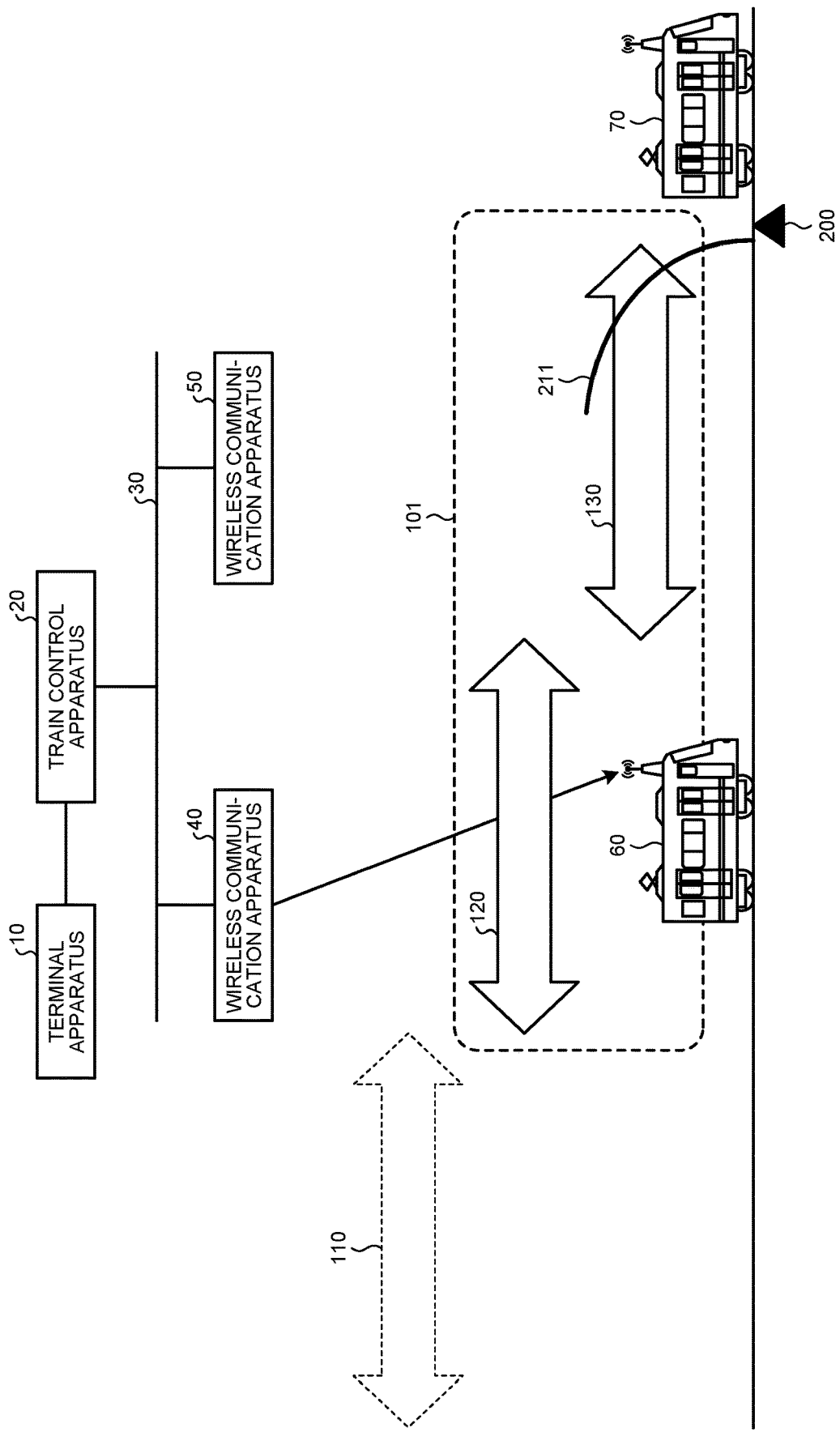
FIG. 3 is a diagram illustrating a second example of the temporary speed limit information transmitted by the train control apparatus according to the first embodiment.

FIG. 3 is a diagram illustrating a second example of the temporary speed limit information transmitted by the train control apparatus 20 according to the first embodiment. When the train 60 passes through the temporary speed limit section 110, then the train control apparatus 20 transmits temporary speed limit information 101 including pieces of information regarding the two temporary speed limit sections 120 and 130 to the train 60. The train 60 generates a speed pattern 211 on the basis of the information regarding the stop limit 200 and the information regarding the temporary speed limit sections 120 and 130 received from the train control apparatus 20. Here, the train 60 acquires information regarding an area of the temporary speed limit section 130 and a speed limit therein by receiving the temporary speed limit information 101. When a difference between the speed limit in the temporary speed limit section 120 and the speed limit in the temporary speed limit section 130 is small, the train 60 can generate, at a stage of receiving the temporary speed limit information 101, the speed pattern 211 which does not exceed the speed limit in the temporary speed limit section 130. On the other hand, when the difference between the speed limit in the temporary speed limit section 120 and the speed limit in the temporary speed limit section 130 is large, that is, when the speed limit in the temporary speed limit section 130 is significantly lower than the speed limit in the temporary speed limit section 120, there is a concern that the train 60 generates, at a stage of receiving the temporary speed limit information 101, the speed pattern 211 which exceeds the speed limit in the temporary speed limit section 130.

Therefore, in a case where there is a plurality of temporary speed limit sections which have been set and it is not possible to include information regarding all temporary speed limit sections in the temporary speed limit information, the control unit 23 in the train control apparatus 20 includes, in the temporary speed limit information, information regarding the specified number of temporary speed limit sections 110 and 120 located on a traveling direction side from the position of the train 60. The case where it is not possible to include information regarding all temporary speed limit sections in the temporary speed limit information is a case where the number of temporary speed limit sections which have been set is equal to or greater than the specified number and there occurs information regarding a temporary speed limit section which cannot be included in the temporary speed limit information. On the basis of the speed limit set in the temporary speed limit section 130 which is adjacent to the temporary speed limit section 120 included in the temporary speed limit information, and is not included in the temporary speed limit information, the control unit 23 changes a speed limit in one or more temporary speed limit sections included in the temporary speed limit information.

Specifically, in the first embodiment, on the basis of the speed limit in the temporary speed limit section 130 which is adjacent to the temporary speed limit section 120 included last in the temporary speed limit information, and cannot be included in the temporary speed limit information, the control unit 23 changes the speed limit in the temporary speed limit section 120 included last in the temporary speed limit information as necessary, and transmits the temporary speed limit information to the train 60.

Figure 4:
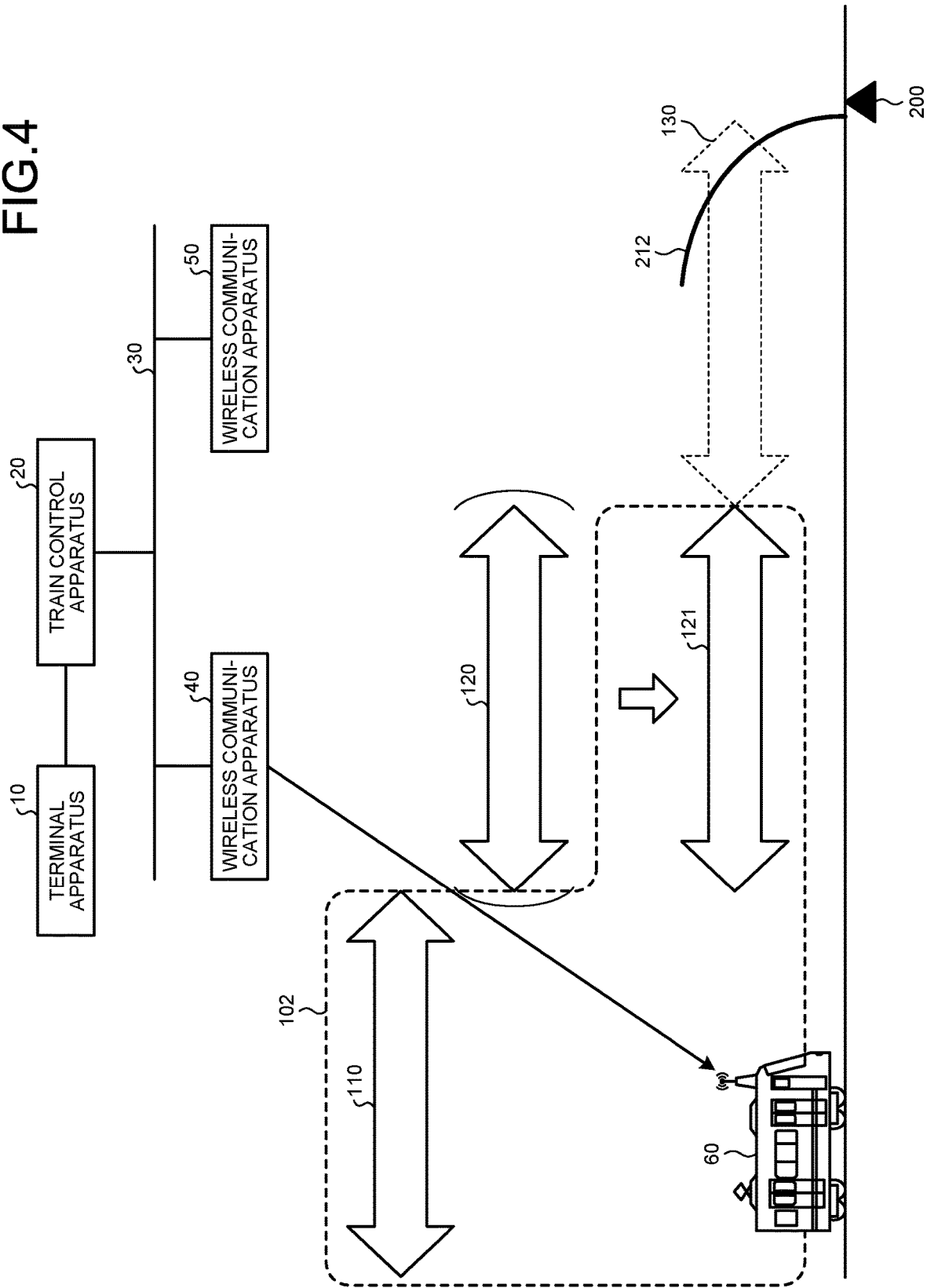
FIG. 4 is a diagram illustrating an example in which the train control apparatus according to the first embodiment changes a speed limit set in a temporary speed limit section and transmits temporary speed limit information.

FIG. 4 is a diagram illustrating an example in which the train control apparatus 20 according to the first embodiment changes the speed limit set in the temporary speed limit section and transmits temporary speed limit information 102. Here, the temporary speed limit section 120 included last in the temporary speed limit information 100 illustrated in FIG. 2 is defined as a first temporary speed limit section, and the speed limit in the temporary speed limit section 120, that is, the first temporary speed limit section, is defined as a first speed limit. In addition, the temporary speed limit section 130 which is adjacent to the first temporary speed limit section and cannot be included in the temporary speed limit information 100 is defined as a second temporary speed limit section, and the speed limit in the temporary speed limit section 130, that is, the second temporary speed limit section, is defined as a second speed limit.

Figure 5:
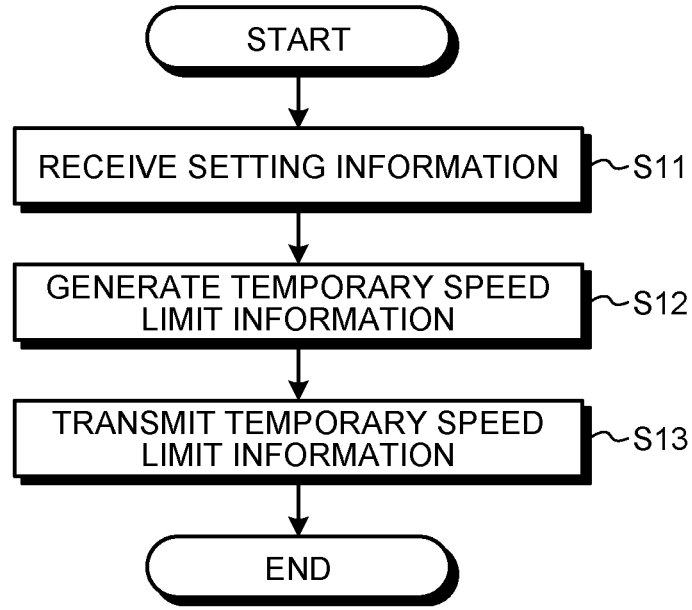
FIG. 5 is a flowchart illustrating an operation in which the train control apparatus according to the first embodiment transmits temporary speed limit information to a train.

FIG. 5 is a flowchart illustrating an operation in which the train control apparatus 20 according to the first embodiment transmits the temporary speed limit information to the train 60. In the train control apparatus 20, the setting reception unit 21 receives setting information regarding temporary speed limit sections, the speed limit in each temporary speed limit section, and the like, from the terminal apparatus 10 (Step S11). The control unit 23 generates temporary speed limit information on the basis of the setting information acquired from the setting reception unit 21 (Step S12). The communication unit 24 transmits the temporary speed limit information acquired from the control unit 23 to the trains 60 and 70 via the communication network 30 and the wireless communication apparatuses 40 and 50 (Step S13).

Figure 6:
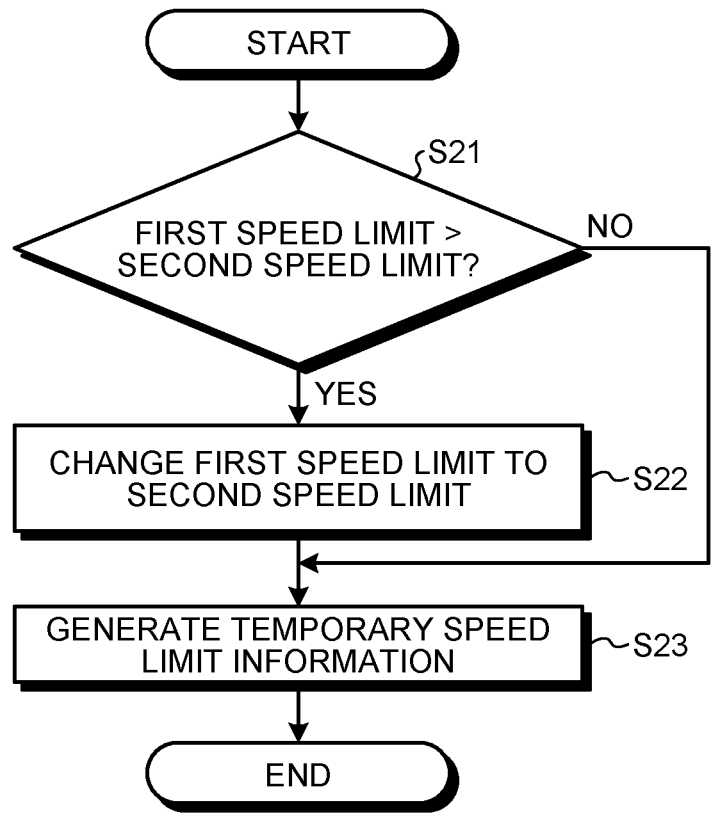
FIG. 6 is a flowchart illustrating an operation of a control unit in the train control apparatus according to the first embodiment.

The operation of the control unit 23 illustrated in Step S12 of FIG. 5 will be described in detail. FIG. 6 is a flowchart illustrating the operation of the control unit 23 in the train control apparatus 20 according to the first embodiment. In the train control apparatus 20, when the control unit 23 transmits the temporary speed limit information 100 including the information regarding the temporary speed limit sections 110 and 120, the control unit 23 compares the first speed limit in the temporary speed limit section 120 with the second speed limit in the temporary speed limit section 130 (Step S21). If the first speed limit is higher (Step S21: Yes), the control unit 23 changes the first speed limit to the second speed limit (Step S22). The temporary speed limit section 120 in which the first speed limit has been changed is defined as a temporary speed limit section 121. After the process in Step S22, the control unit 23 generates the temporary speed limit information 102 including information regarding the temporary speed limit sections 110 and 121 and a speed limit in each of the temporary speed limit sections 110 and 121 (Step S23). If the first speed limit is equal to or lower than the second speed limit (Step S21: No), the control unit 23 generates the temporary speed limit information 100 including information regarding the temporary speed limit sections 110 and 120 and the speed limit in each of the temporary speed limit sections 110 and 120 (Step S23). The control unit 23 outputs the generated temporary speed limit information 100 or temporary speed limit information 102 to the communication unit 24. The communication unit 24 transmits the temporary speed limit information 100 or the temporary speed limit information 102 to the train 60 via the communication network 30 and the wireless communication apparatus 40.

This makes it possible for the train 60 to generate a speed pattern 212 on the basis of information regarding the speed limit in the temporary speed limit section 130 even when the information regarding the temporary speed limit section 130 has not been received, and consequently, it is possible to avoid a situation where the speed limit in the temporary speed limit section 130 is exceeded in the temporary speed limit section 130.

Next, a hardware configuration of the train control apparatus 20 will be described. In the train control apparatus 20, the setting reception unit 21 is realized by an interface circuit. The storage unit 22 is a memory. The communication unit 24 is a wired or wireless communication apparatus. The control unit 23 is realized by a processing circuit. That is, the train control apparatus 20 includes a processing circuit capable of generating temporary speed limit information by changing a speed limit so that the train 60 does not exceed a speed limit set in the temporary speed limit section. The processing circuit may be a processor which executes a program stored in a memory and the memory, or may be dedicated hardware.

Figure 7:
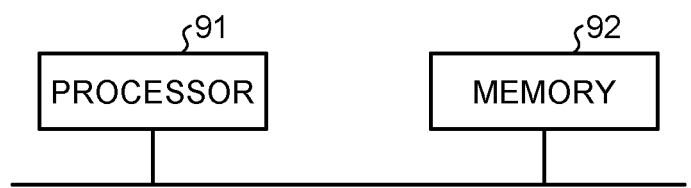
FIG. 7 is a diagram illustrating an example in which a processing circuit included in the train control apparatus according to the first embodiment is configured with a processor and a memory.

FIG. 7 is a diagram illustrating an example in which a processing circuit included in the train control apparatus 20 according to the first embodiment is configured with a processor and a memory. When the processing circuit is configured with a processor 91 and a memory 92, functions of the processing circuit of the train control apparatus 20 are realized by software, firmware, or a combination of software and firmware. The software or the firmware is described as a program and stored in the memory 92. In the processing circuit, the processor 91 reads and executes the program stored in the memory 92, thereby realizing the functions. That is, the processing circuit includes the memory 92 for storing programs. With these programs, generation of the temporary speed limit information by changing a speed limit so that the train 60 does not exceed a speed limit set in the temporary speed limit section is executed as a result. It can also be said that these programs cause a computer to execute procedures and methods of the train control apparatus 20.

Here, the processor 91 may be a central processing unit (CPU), a processing device, an arithmetic device, a microprocessor, a microcomputer, a digital signal processor (DSP), or the like. The memory 92 corresponds to, for example, a non-volatile or volatile semiconductor memory such as a random access memory (RAM), a read only memory (ROM), a flash memory, an erasable programmable ROM (EPROM), or an electrically EPROM (EEPROM (registered trademark)), a magnetic disk, a flexible disk, an optical disk, a compact disc, a mini disk, or a digital versatile disc (DVD).

Figure 8:
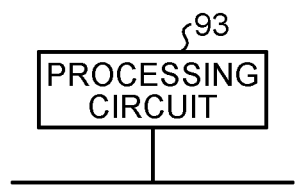
FIG. 8 is a diagram illustrating an example in which the processing circuit included in the train control apparatus according to the first embodiment is configured with dedicated hardware.

FIG. 8 is a diagram illustrating an example in which the processing circuit included in the train control apparatus 20 according to the first embodiment is configured with dedicated hardware. When the processing circuit is configured with dedicated hardware, the processing circuit 93 illustrated in FIG. 8 corresponds to, for example, a single circuit, a composite circuit, a programmed processor, a parallel programmed processor, an application specific integrated circuit (ASIC), a field programmable gate array (FPGA), or a combination thereof. Functions of the train control apparatus 20 may be separately realized by the processing circuits 93, or the functions may be collectively realized by the processing circuit 93.

A part of the functions of the train control apparatus 20 may be realized by dedicated hardware and another part thereof may be realized by software or firmware. Thus, the processing circuit can realize each of the above-described functions by dedicated hardware, software, firmware, or a combination thereof.

As described above, according to the present embodiment, in the train control apparatus 20, when the control unit 23 generates the temporary speed limit information 100 including the information regarding the temporary speed limit sections 110 and 120, the control unit 23 compares the speed limit in the temporary speed limit section 120 with the speed limit in the temporary speed limit section 130, and if the speed limit in the temporary speed limit section 130 is lower, the control unit 23 changes the speed limit in the temporary speed limit section 120 to the speed limit in the temporary speed limit section 130. In that case, the control unit 23 generates the temporary speed limit information 102 including the information regarding the temporary speed limit sections 110 and 121. This makes it possible for the control unit 23 to, when a plurality of temporary speed limit sections is set, operate the train 60 so as not to exceed the speed limit in each temporary speed limit section.

Second Embodiment

In the first embodiment, on the basis of the first speed limit in the first temporary speed limit section and the second speed limit in the second temporary speed limit section, the train control apparatus 20 changes the first speed limit to the second speed limit if the first speed limit is higher. In a second embodiment, a third speed limit set in a third temporary speed limit section, which is a temporary speed limit section immediately preceding the first temporary speed limit section, is changed depending on conditions. Differences from the first embodiment will be described.

Figure 9:
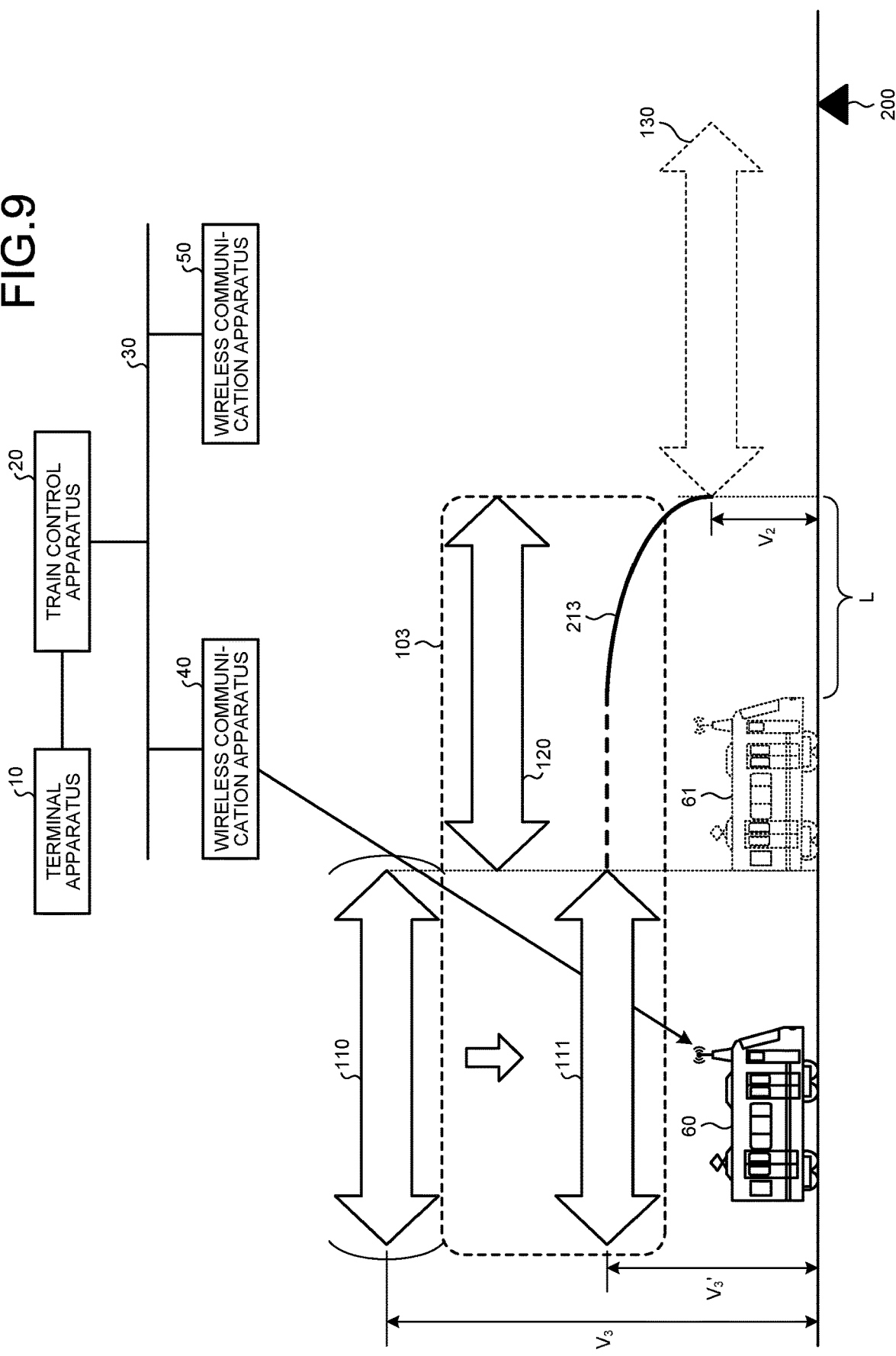
FIG. 9 is a diagram illustrating an example in which the train control apparatus according to a second embodiment changes a speed limit set in a temporary speed limit section and transmits temporary speed limit information.

In the second embodiment, configurations of the wireless train control system 1 and the train control apparatus 20 are similar to the configurations of the wireless train control system 1 and the train control apparatus 20 of the first embodiment. FIG. 9 is a diagram illustrating an example in which the train control apparatus 20 according to the second embodiment changes a speed limit set in a temporary speed limit section and transmits temporary speed limit information 103. In FIG. 9, the train 61 indicates a position obtained when the train 60 has completely advanced from the temporary speed limit section 110 to the temporary speed limit section 120. A deceleration distance L indicates a distance from a head position of the train 61 to a start point of the temporary speed limit section 130 when the train 60 has completely advanced from the temporary speed limit section 110 to the temporary speed limit section 120. The start point of the temporary speed limit section 130 is a position closest to the train 61 in the temporary speed limit section 130 illustrated in FIG. 9. In addition, the temporary speed limit section 110 which is adjacent to the first temporary speed limit section and immediately preceding the first temporary speed limit section is defined as a third temporary speed limit section, and the speed limit in the temporary speed limit section 110, that is, the third temporary speed limit section, is defined as a third speed limit.

Figure 10:
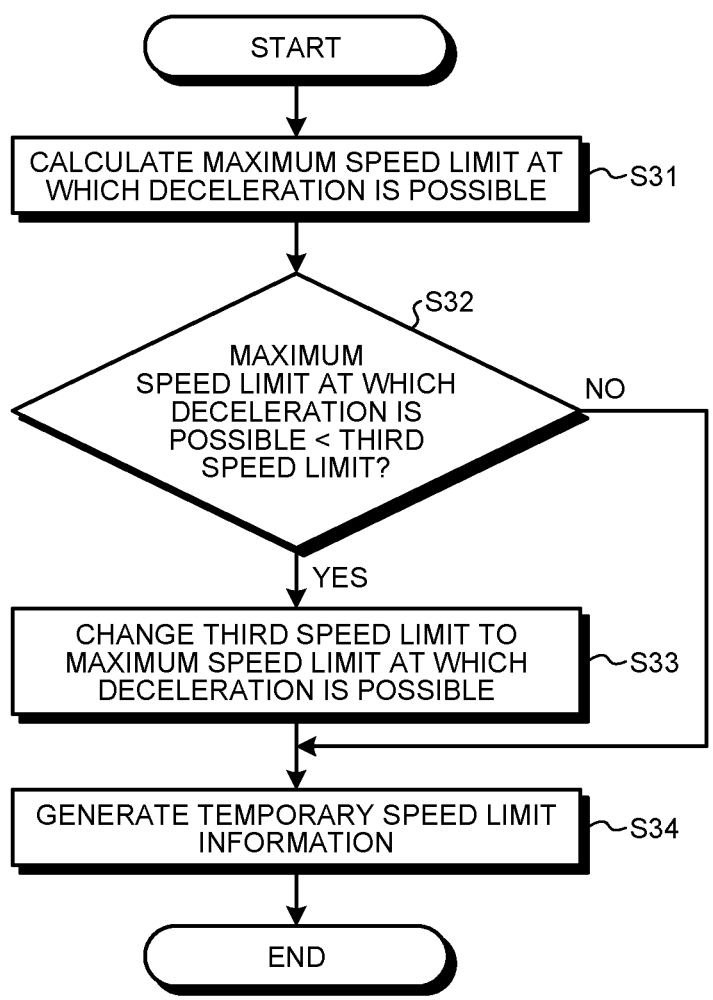
FIG. 10 is a flowchart illustrating an operation of the control unit in the train control apparatus according to the second embodiment.

The operation of the train control apparatus 20 at that time is similar to the operation in the first embodiment illustrated in FIG. 5, except for Step S12 in FIG. 5. The operation of the control unit 23 according to the second embodiment illustrated in Step S12 in FIG. 5 will be described in detail. FIG. 10 is a flowchart illustrating the operation of the control unit 23 in the train control apparatus 20 according to the second embodiment. In the train control apparatus 20, the control unit 23 calculates a maximum speed limit in the temporary speed limit section 110 at which the train 61 that has completely advanced from the temporary speed limit section 110 to the temporary speed limit section 120 can decelerate to the second speed limit in the temporary speed limit section 130 (Step S31). Here, the second speed limit is denoted by a speed $V_2$ [km/h], the third speed limit is denoted by $V_3$ [km/h], the maximum speed limit at which the deceleration is possible is denoted by $V_3'$ [km/h], a normal maximum braking coefficient is denoted by $\beta$ [km/h/s], and the deceleration distance is denoted by L [m]. When not considering idle running and a gradient, a calculation formula "$L=(V3'2-V22)/(7.2\times\beta)$" holds, so that the control unit 23 calculates the maximum speed limit $V_3'$ at which the deceleration is possible using the calculation formula. The control unit 23 compares the calculated speed limit, that is, the maximum speed limit $V_3'$ at which the deceleration is possible, with the third speed limit $V_3$ (Step S32). If the maximum speed limit $V_3'$ at which the deceleration is possible is lower (Step S32: Yes), the control unit 23 changes the third speed limit $V_3$ to the maximum speed limit $V_3'$ at which the deceleration is possible (Step S33). The temporary speed limit section 110 in which the third speed limit has been changed is defined as a temporary speed limit section 111. After the process in Step S33, the control unit 23 generates the temporary speed limit information 103 including information regarding the temporary speed limit sections 111 and 120 and the speed limit in each of the temporary speed limit sections 111 and 120 (Step S34). If the maximum speed limit $V_3'$ at which the deceleration is possible is equal to or higher than the third speed limit $V_3$ (Step S32: No), the control unit 23 generates the temporary speed limit information 100 including information regarding the temporary speed limit sections 110 and 120 and the speed limit in each of the temporary speed limit sections 110 and 120 (Step S34). The control unit 23 outputs the generated temporary speed limit information 100 or temporary speed limit information 103 to the communication unit 24. The communication unit 24 transmits the temporary speed limit information 100 or the temporary speed limit information 103 to the train 60 via the communication network 30 and the wireless communication apparatus 40.

This makes it possible for the train 60 to generate a speed pattern 213 on the basis of information regarding the speed limit in the temporary speed limit section 130 even when the information regarding the temporary speed limit section 130 has not been received, and consequently, it is possible to avoid a situation where the speed limit in the temporary speed limit section 130 is exceeded in the temporary speed limit section 130. In the example of the second embodiment illustrated in FIG. 9, the number of temporary speed limit sections which can be included in the temporary speed limit information 103 is two, but there is no limitation thereto. When it is possible to include information regarding three or more temporary speed limit sections and the speed limit in each of the temporary speed limit sections in the temporary speed limit information 103, the control unit 23 may perform the process illustrated in the flowchart of FIG. 10 for, in addition to the temporary speed limit section preceding the last temporary speed limit section, one or more temporary speed limit sections further preceding the above-described preceding temporary speed limit section. This makes it possible for the train 60 to decrease the speed thereof well in advance, and therefore, it is further possible to avoid a situation where the speed limit in the temporary speed limit section 130 is exceeded.

As described above, according to the present embodiment, in the train control apparatus 20, when the control unit 23 generates the temporary speed limit information 100 including the information regarding the temporary speed limit sections 110 and 120, the control unit 23 calculates the maximum speed limit in the temporary speed limit section 110 at which the deceleration to the speed limit in the temporary speed limit section 130 is possible, and if the calculated speed limit is lower than the speed limit set in the temporary speed limit section 110, the control unit 23 changes the speed limit in the temporary speed limit section 110 to the calculated speed limit. In that case, the control unit 23 generates the temporary speed limit information 103 including information regarding the temporary speed limit sections 111 and 120. This makes it possible for the control unit 23 to, when a plurality of temporary speed limit sections is set similarly to the first embodiment, operate the train 60 so that the speed limit is not exceeded in each of the temporary speed limit sections.

Third Embodiment

In the first and second embodiments, in a case where the information regarding all temporary speed limit sections cannot be included in the temporary speed limit information, the train control apparatus 20 changes the information regarding the speed limits in the temporary speed limit sections to be included in the temporary speed limit section information depending on conditions. In a third embodiment, the train control apparatus 20 includes, in protection information, information regarding a temporary speed limit section which cannot be included in temporary speed limit information, and transmits the protection information. Differences from the first and second embodiments will be described.

In the third embodiment, configurations of the wireless train control system 1 and the train control apparatus 20 are similar to the configurations of the wireless train control system 1 and the train control apparatus 20 of the first and second embodiments. The train control apparatus 20 generates temporary speed limit information for a construction section, a bad weather section, and the like, on the basis of a temporary speed limit section set by the terminal apparatus 10. The train control apparatus 20 transmits the generated temporary speed limit information to the train 60, and performs control to temporarily limit the speed of the train 60 in the temporary speed limit section.

In addition, the train control apparatus 20 generates protection information for a section where a personal injury has occurred, such as a station or a railroad crossing, on the basis of a protection section set by the terminal apparatus 10. The train control apparatus 20 transmits the generated protection information to the train 60, and performs control to prohibit the train 60 from entering the protection section. In a case of transmitting the protection information to the train 60, the train control apparatus 20 has a limit on the number of protection sections which can be transmitted by single transmission of protection information, similarly to the case of transmitting the temporary speed limit information.

Here, in the present embodiment, when there is information regarding a temporary speed limit section which cannot be transmitted included in the temporary speed limit information, and the number of protection sections in the protection information does not reach the maximum number of transmissions and there is room therein, the train control apparatus 20 regards the information regarding the temporary speed limit section which cannot be transmitted included in the temporary speed limit information as information regarding the protection section, includes the information in the protection information, and transmits the protection information. The number of pieces of temporary speed limit information to be included in the protection information by the train control apparatus 20 may be one or more than one. At that time, the train control apparatus 20 regards a speed limit set in the temporary speed limit section to be included in the protection information as zero. When the speed limit in the temporary speed limit section is zero, the content indicated by the temporary speed limit section is the same as the content indicated by the protection section.

FIG. 11 is a diagram illustrating a first example of a case where the train control apparatus 20 according to the third embodiment transmits the protection information with information regarding the temporary speed limit section included therein. FIG. 11 is obtained by deleting the train 70, the stop limit 200, and the speed pattern 210 from FIG. 2 illustrated in the first embodiment, and adding protection information 300 and a protection section 310 thereto. Here, the train control apparatus 20 can transmit the protection information 300 with pieces of information regarding two protection sections included therein. When the number of pieces of information regarding the protection section 310 is one and there is room in the protection information 300, the train control apparatus 20 transmits the protection information 300 with information regarding the temporary speed limit section 130 included therein. However, in the protection information 300, the speed limit in the temporary speed limit section 130 is regarded as zero. The train 60 receives the temporary speed limit information 100 and the protection information 300 from the train control apparatus 20. The train 60 generates a speed pattern on the basis of the temporary speed limit information 100 and the protection information 300 so as not to exceed the speed limit in each of the temporary speed limit sections 110 and 120 and to be able to stop at the start point of the temporary speed limit section 130. Since the train 60 travels so as to be able to stop at the start point of the temporary speed limit section 130, even if the train 60 receives the temporary speed limit information 101 of FIG. 3 illustrated in the first embodiment after passing through the temporary speed limit section 110, the train 60 can travel without exceeding the speed limit in the temporary speed limit section 130 included in the temporary speed limit information 101.

FIG. 12 is a flowchart illustrating an operation in which the train control apparatus 20 according to the third embodiment transmits temporary speed limit information and protection information to the train 60. In the train control apparatus 20, the setting reception unit 21 receives setting information regarding temporary speed limit sections, a speed limit in each temporary speed limit section, a protection section, and the like, from the terminal apparatus 10 (Step S41). The control unit 23 generates temporary speed limit information and protection information on the basis of the setting information acquired from the setting reception unit 21 (Step S42). The communication unit 24 transmits the temporary speed limit information and the protection information acquired from the control unit 23 to the trains 60 and 70 via the communication network 30 and the wireless communication apparatuses 40 and 50 (Step S43).

The operation of the control unit 23 illustrated in Step S42 of FIG. 12 will be described in detail. FIG. 13 is a flowchart illustrating a first example of the operation of the control unit 23 in the train control apparatus 20 according to the third embodiment. The control unit 23 checks whether there is information regarding a temporary speed limit section which cannot be included in the temporary speed limit information (Step S51). If there is information regarding the temporary speed limit section which cannot be included in the temporary speed limit information (Step S51: Yes), the control unit 23 checks whether there is room in the protection information (Step S52). If there is room in the protection information (Step S52: Yes), the control unit 23 generates temporary speed limit information without changing the speed limit in the temporary speed limit section to be included in the temporary speed limit information (Step S53). In addition, the control unit 23 generates protection information by including, in the protection information, the information regarding the temporary speed limit section which cannot be included in the temporary speed limit information while regarding the speed limit therein as zero (Step S54). If there is no room in the protection information (Step S52: No), the control unit 23 generates temporary speed limit information by changing as necessary the speed limit in the temporary speed limit section to be included in the temporary speed limit information by the method according to the first or second embodiment on the basis of the information regarding the temporary speed limit section which cannot be included in the temporary speed limit information (Step S55). If the information regarding all temporary speed limit sections can be included in the temporary speed limit information (Step S51: No), the control unit 23 generates the temporary speed limit information by including information regarding all temporary speed limit sections, without changing speed limits in respective temporary speed limit sections (Step S56).

In a case where there is information regarding a temporary speed limit section which cannot be transmitted included in by the temporary speed limit information, and the number of protection sections in the protection information reaches the maximum number of transmissions and there is no room therein, the train control apparatus 20 may include, in the protection information, information regarding sections, among the temporary speed limit section which cannot be transmitted included in the temporary speed limit information and the protection sections, in descending order of closeness of a start end of each section to the train 60, and may transmit the protection information. The number of pieces of temporary speed limit information to be included in the protection information by the train control apparatus 20 may be one or more than one, but the number is zero in some cases. When there is information regarding the temporary speed limit section to be included in the protection information, the train control apparatus 20 regards the speed limit set in the temporary speed limit section as zero.

FIG. 14 is a diagram illustrating a second example of the case where the train control apparatus 20 according to the third embodiment transmits the protection information with information regarding the temporary speed limit section included therein. FIG. 14 is obtained by replacing the protection information 300 of FIG. 11 with protection information 301 and adding a protection section 320 thereto. Here, the train control apparatus 20 can transmit the protection information 301 with pieces of information regarding two protection sections included therein. In view of the fact that the number of pieces of information regarding the protection sections 310 and 320 is two and there is no room in the protection information 301, the train control apparatus 20 does not include the protection section 320 in the protection information 301 but includes the information regarding the temporary speed limit section 130 and the protection section 310 therein because the temporary speed limit section 130 is closer to the train 60 than the protection sections 310 and 320, and transmits the protection information 301. However, in the protection information 301, the speed limit in the temporary speed limit section 130 is regarded as zero. The train 60 receives the temporary speed limit information 100 and the protection information 301 from the train control apparatus 20. The train 60 generates a speed pattern on the basis of the temporary speed limit information 100 and the protection information 301 so as not to exceed the speed limit in each of the temporary speed limit sections 110 and 120 and to be able to stop at the start point of the temporary speed limit section 130. Since the train 60 travels so as to be able to stop at the start point of the temporary speed limit section 130, even if the train 60 receives the temporary speed limit information 101 of FIG. 3 illustrated in the first embodiment after passing through the temporary speed limit section 110, the train 60 can travel without exceeding the speed limit in the temporary speed limit section 130 included in the temporary speed limit information 101.

The operation of the train control apparatus 20 at that time is similar to the operation illustrated in the flowchart of FIG. 12 described above, except for Step S42 in FIG. 12. The operation of the control unit 23 illustrated in Step S42 of FIG. 12 will be described in detail. FIG. 15 is a flowchart illustrating a second example of the operation of the control unit 23 in the train control apparatus 20 according to the third embodiment. The flowchart illustrated in FIG. 15 is obtained by replacing Step S55 of the flowchart illustrated in FIG. 13 with Step S55a and Step S55b. If there is no room in the protection information (Step S52: No), the control unit 23 selects a number of pieces of information, which can be included in the protection information, regarding sections, among the temporary speed limit section which cannot be included in the temporary speed limit information and the protection sections, in descending order of closeness of a start end of each section to the train 60. The control unit 23 generates protection information by including information regarding the selected section in the protection information (Step S55a). In a case where the protection information generated in Step S55a includes a temporary speed limit section which cannot be included in the temporary speed limit information, the control unit 23 generates temporary speed limit information without changing speed limits in respective temporary speed limit sections (Step S55b). Alternatively, in a case where the protection information generated in Step S55a does not include the temporary speed limit section which cannot be included in the temporary speed limit information, the control unit 23 generates temporary speed limit information by changing as necessary the speed limit in the temporary speed limit section to be included in the temporary speed limit information by the method according to the first or second embodiment on the basis of the information regarding the temporary speed limit section which cannot be included in the temporary speed limit information (Step S55b).

As described above, in a case where there is a plurality of set temporary speed limit sections and information regarding all the temporary speed limit sections cannot be included in the temporary speed limit information, the control unit 23 in the train control apparatus 20 generates the protection information. The protection information includes information regarding a specified number of protection sections, or protection sections and temporary speed limit sections where speed limits are regarded as zero, the sections being located on a traveling direction side from a position of the train 60, among one or more protection sections set as sections where the entry of the train 60 is prohibited and one or more temporary speed limit sections not included in the temporary speed limit information. The communication unit 24 transmits the protection information generated by the control unit 23 to each train.

As described above, according to the present embodiment, in the train control apparatus 20, the control unit 23 includes, in the protection information for transmitting the information regarding the protection section, the information regarding the temporary speed limit section which cannot be included in the temporary speed limit information while regarding the speed limit as zero, depending on a setting state of the protection section. This makes it possible for the control unit 23 to, when a plurality of temporary speed limit sections is set, operate the train 60 so as not to exceed the speed limit in each temporary speed limit section.

The configurations described in the embodiments above are merely examples of the content of the present invention and can be combined with other known technology and part thereof can be omitted or modified without departing from the gist of the present invention.

REFERENCE SIGNS LIST

1 wireless train control system; 10 terminal apparatus; 20 train control apparatus; 21 setting reception unit; 22 storage unit; 23 control unit; 24 communication unit; 30 communication network; 40, 50 wireless communication apparatus; 60, 61, 70 train; 110, 111, 120, 121, 130 temporary speed limit section; 100 to 103 temporary speed limit information; 200 stop limit; 210 to 213 speed pattern; 300, 301 protection information; 310, 320 protection section.

The invention claimed is:

1. A train control apparatus that controls operation of a train, the apparatus comprising:
setting reception circuitry to receive setting information regarding a temporary speed limit section where a speed of the train is temporarily limited, and a speed limit in the temporary speed limit section;
control circuitry to generate temporary speed limit information for each train with respect to trains that travel within a control range on a basis of the setting information; and communication circuitry to transmit the temporary speed limit information to each train, wherein in a case where it is not possible to include information regarding all temporary speed limit sections in the temporary speed limit information, the control circuitry includes, in the temporary speed limit information, information regarding a specified number of temporary speed limit sections located on a traveling direction side from a position of the train, and changes a speed limit in one or more temporary speed limit sections included in the temporary speed limit information on a basis of a speed limit set in a temporary speed limit section that is adjacent to a temporary speed limit section included in the temporary speed limit information, and is not included in the temporary speed limit information.

2. The train control apparatus according to claim 1, wherein a temporary speed limit section included last in the temporary speed limit information is defined as a first temporary speed limit section, a speed limit in the first temporary speed limit section is defined as a first speed limit, a temporary speed limit section that is adjacent to the first temporary speed limit section and is not included in the temporary speed limit information is defined as a second temporary speed limit section, and a speed limit in the second temporary speed limit section is defined as a second speed limit, and the control circuitry compares the first speed limit with the second speed limit, and if the first speed limit is higher, the control circuitry changes the first speed limit to the second speed limit.

3. The train control apparatus according to claim 1, wherein a temporary speed limit section included last in the temporary speed limit information is defined as a first temporary speed limit section, a speed limit in the first temporary speed limit section is defined as a first speed limit, a temporary speed limit section that is adjacent to the first temporary speed limit section and is not included in the temporary speed limit information is defined as a second temporary speed limit section, a speed limit in the second temporary speed limit section is defined as a second speed limit, a temporary speed limit section immediately preceding the first temporary speed limit section is defined as a third temporary speed limit section, and a speed limit in the third temporary speed limit section is defined as a third speed limit, and the control circuitry calculates a maximum speed limit in the third temporary speed limit section at which a train that has completely advanced from the third temporary speed limit section is capable of decelerating to the second speed limit in the second temporary speed limit section, compares the calculated speed limit with the third speed limit, and if the calculated speed limit is lower, the control circuitry changes the third speed limit to the calculated speed limit.

4. A train control apparatus that controls operation of a train, the apparatus comprising:

setting reception circuitry to receive setting information regarding a temporary speed limit section where a speed of the train is temporarily limited, a speed limit in the temporary speed limit section, and a protection section where entry of the train is prohibited;

control circuitry to generate temporary speed limit information and protection information for each train with respect to trains that travel within a control range on a basis of the setting information; and communication circuitry to transmit the temporary speed limit information and the protection information to each train, wherein in a case where it is not possible to include information regarding all temporary speed limit sections in the temporary speed limit information, the control circuitry generates protection information including information regarding a specified number of protection sections, or protection sections and temporary speed limit sections where speed limits are regarded as zero, the sections being located on a traveling direction side from a position of the train, among one or more protection sections and one or more temporary speed limit sections not included in the temporary speed limit information.

5. A train control method in a train control apparatus that controls operation of a train, the method comprising:

by setting reception circuitry, receiving setting information regarding a temporary speed limit section where a speed of the train is temporarily limited and a speed limit in the temporary speed limit section;

by control circuitry, generating temporary speed limit information for each train with respect to trains that travel within a control range on a basis of the setting information acquired from the setting reception unit; and by communication circuitry, transmitting the temporary speed limit information to each train, wherein in a case where it is not possible to include information regarding all temporary speed limit sections in the temporary speed limit information, when generating the temporary speed limit information, the control circuitry includes, in the temporary speed limit information, information regarding a specified number of temporary speed limit sections located on a traveling direction side from a position of the train, and changes a speed limit in one or more temporary speed limit sections included in the temporary speed limit information on a basis of a speed limit set in a temporary speed limit section that is adjacent to a temporary speed limit section included in the temporary speed limit information, and is not included in the temporary speed limit information.

6. The train control method according to claim 5, wherein a temporary speed limit section included last in the temporary speed limit information is defined as a first temporary speed limit section, a speed limit in the first temporary speed limit section is defined as a first speed limit, a temporary speed limit section that is adjacent to the first temporary speed limit section and is not included in the temporary speed limit information is defined as a second temporary speed limit section, a speed limit in the second temporary speed limit section is defined as a second speed limit, and when generating the temporary speed limit information, the control circuitry compares the first speed limit with the second speed limit, and if the first speed limit is higher, the control circuitry changes the first speed limit to the second speed limit.

7. The train control method according to claim 5, wherein a temporary speed limit section included last in the temporary speed limit information is defined as a first temporary speed limit section, a speed limit in the first temporary speed limit section is defined as a first speed limit, a temporary speed limit section that is adjacent to the first temporary speed limit section and is not included in the temporary speed limit information is defined as a second temporary speed limit section, a speed limit in the second temporary speed limit section is defined as a second speed limit, a temporary speed limit section immediately preceding the first temporary speed limit section is defined as a third temporary speed limit section, and a speed limit in the third temporary speed limit section is defined as a third speed limit, and when generating the temporary speed limit information, the control circuitry calculates a maximum speed limit in the third temporary speed limit section at which a train that has completely advanced from the third temporary speed limit section is capable of decelerating to the second speed limit in the second temporary speed limit section, compares the calculated speed limit with the third speed limit, and if the calculated speed limit is lower, the control circuitry changes the third speed limit to the calculated speed limit.

* * * * *